United States Patent
Gruner-Nielsen et al.

(10) Patent No.: US 9,482,817 B2
(45) Date of Patent: Nov. 1, 2016

(54) OPTICAL MODE CONVERSION BY NONLINEAR EFFECTS

(71) Applicant: OFS Fitel, LLC, Norcross, GA (US)

(72) Inventors: Lars Gruner-Nielsen, Copenhagen (DK); Dan P Jakobsen, Copenhagen (DK); Martin E. V. Pedersen, Copenhagen (DK); Chris Xu, Ithaca, NY (US); Ji Cheng, Beijing (CN)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/362,456

(22) PCT Filed: Dec. 6, 2012

(86) PCT No.: PCT/US2012/068259
§ 371 (c)(1),
(2) Date: Jun. 3, 2014

(87) PCT Pub. No.: WO2013/101429
PCT Pub. Date: Jul. 4, 2013

(65) Prior Publication Data
US 2014/0334766 A1    Nov. 13, 2014

Related U.S. Application Data

(60) Provisional application No. 61/567,129, filed on Dec. 6, 2011.

(51) Int. Cl.
*G02F 1/295* (2006.01)
*G02B 6/14* (2006.01)
*G02F 1/35* (2006.01)
*G02F 1/365* (2006.01)

(52) U.S. Cl.
CPC ............... *G02B 6/14* (2013.01); *G02F 1/3536* (2013.01); *G02F 1/365* (2013.01); *G02F 2201/02* (2013.01); *G02F 2201/05* (2013.01)

(58) Field of Classification Search
CPC ........ G02B 6/14; G02F 1/3536; G02F 1/365
USPC .......................................................... 385/5
See application file for complete search history.

(56) References Cited

U.S. PATENT DOCUMENTS

2007/0041083 A1* 2/2007 Di Teodoro et al. .......... 359/333
2011/0063718 A1* 3/2011 Tu et al. ....................... 359/327

* cited by examiner

*Primary Examiner* — Jerry Blevins
(74) *Attorney, Agent, or Firm* — Jon Fallon, Esq.

(57) ABSTRACT

Embodiments of the present invention generally relate to optical mode conversion by nonlinear effects. More specifically, embodiments of the present invention relate to nonlinear mode conversion utilizing intermodal four-wave mixing to convert light between modes having different wavelengths for complex applications. In one embodiment of the present invention, a fiber comprises an input end for receiving light in a first mode at a first wavelength, and an output end for outputting light in a desired second mode at a desired second wavelength, wherein the first wavelength and the second wavelength are not the same. In many embodiments, the fiber comprises a higher-order mode fiber.

6 Claims, 3 Drawing Sheets

OPTICAL MODE CONVERSION BY NONLINEAR EFFECTS

CROSS-REFERENCE TO RELATED APPLICATIONS

The present application claims priority to and is a National Stage Entry of PCT Application No. PCT/US12/68259 filed on Dec. 6, 2012, which claims priority to U.S. Provisional Patent Application No. 61/567,129, entitled "Nonlinear Mode Conversion," filed Dec. 6, 2011, the disclosures of which are incorporated by reference herein in their entireties.

BACKGROUND

1. Field of the Invention

Embodiments of the present invention generally relate to optical mode conversion by nonlinear effects. More specifically, embodiments of the present invention relate to non-linear mode conversion utilizing intermodal four-wave mixing to convert light between modes for complex applications.

2. Description of the Related Art

For the use of optical fibers that support more than a single mode, it is desirable for many applications to have some way of coupling/converting light from one mode to another mode. There are many known ways to accomplish such conversion of light based on a linear conversion process. Among these linear conversion methods include the use of traditional mode converters, such as long period gratings, phase plates or spatial light modulators with the fiber.

In a typical linear mode conversion process, light may be provided in the fundamental ($LP_{01}$) mode. The light is then passed through a traditional mode converter to convert light to a different mode, e.g., $LP_{02}$. When using a traditional linear mode converter, the converted light is usually generated at the same wavelength at the input light, and for many applications, this is either acceptable or desirable. However, in certain instances, the operation bandwidth of a given application could be increased by being able to have the converted light generated at a different wavelength than the original input light.

Four-wave mixing is an intermodulation phenomenon in non-linear optics, whereby interactions between two wavelengths produce two extra wavelengths in the signal. Normally, four-wave mixing is utilized with various wavelengths within the same mode. As such, utilizing of a four-wave mixing process to attain mode conversion would traditionally require a grating or other form of known modecoverter.

Thus, there is a need for a method of nonlinear mode conversion to open up a vast new application area, which may be further enhanced with signal processing such as wavelength conversion, parametric amplification, high speed switching, optical sampling, pulse compression, optical regeneration, or the like.

SUMMARY

Embodiments of the present invention generally relate to optical mode conversion by nonlinear effects. More specifically, embodiments of the present invention relate to non-linear mode conversion utilizing intermodal four-wave mixing to convert light between modes and wavelengths for complex applications.

In one embodiment of the present invention, a fiber comprises an input end for receiving light in a first mode at a first wavelength, and an output end for outputting light in a desired second mode at a desired second wavelength, wherein the first wavelength and the second wavelength are not the same. In many embodiments, the fiber comprises a higher-order mode fiber.

In another embodiment, a system for non-linear mode conversion comprises: a light source for providing an input light in a first mode at a first wavelength; and a fiber comprising an input end for receiving the input light from the light source, and an output end for outputting light in a desired second mode at a desired second wavelength, wherein the first wavelength and the second wavelength are not the same.

In yet another embodiment, a method of nonlinear mode conversion of light comprises: providing a light source capable of producing an input light in a first mode at a first wavelength; providing a fiber having an input end for receiving the input light from the light source, and an output end for outputting an output light in a desired second mode at a desired second wavelength; generating the input light at the light source; and utilizing a means for intermodal four-wave mixing to convert the input light to the output light; wherein the first wavelength and the second wavelength are not the same.

In accordance with one embodiment of the present invention, a fiber is designed using a phase matching condition between the first and second modes, and also having a nonzero field overlap integral, such that it is possible to have an intermodal four-wave mixing process within the fiber.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
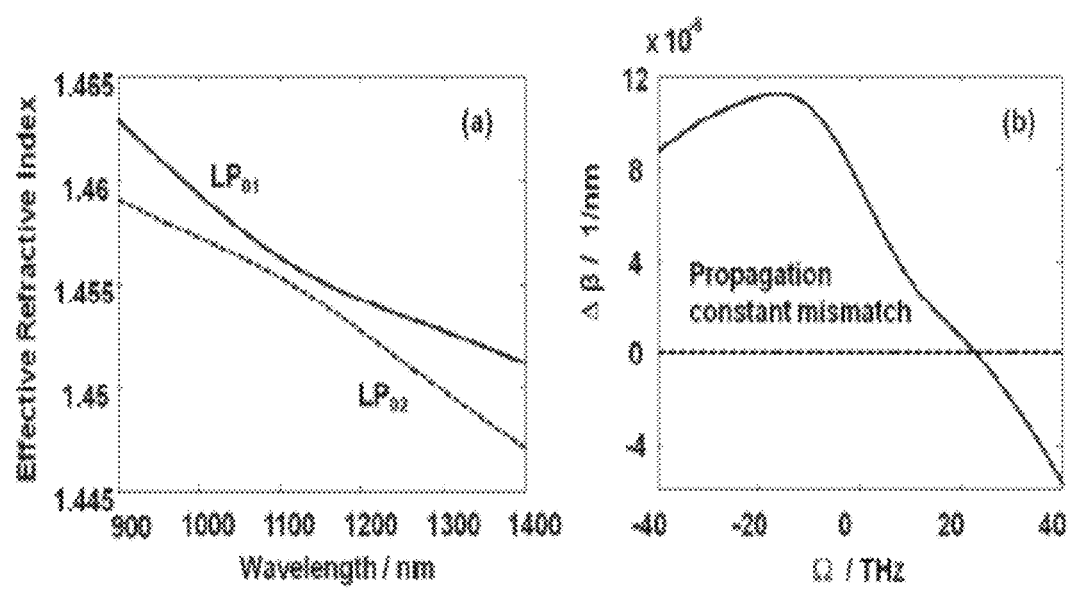
FIG. 1 depicts graphs showing the effective refractive index of the $LP_{01}$ and $LP_{02}$ mode of a higher order mode fiber (left), and a propagation constant mismatch $\Delta\beta$ between $LP_{01}$ and $LP_{02}$ as a function of Stokes shift $\Omega$, for a pump wavelength at 1064 nm, in accordance with one experimental embodiment of the present invention; $\Delta\beta$ is written as $2\beta_{01,P}-\beta_{01,A}(\Omega)-\beta_{02,S}(\Omega)$, $\beta$ is the propagation constant and the subscripts signify the pump (P), Anti-Stokes (A) and Stokes (S) in the $LP_{01}$ mode (01) and LP02 mode (02), where $\Omega$ is the Stokes shift.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention generally relate to optical mode conversion by nonlinear effects. More specifically, embodiments of the present invention relate to nonlinear mode conversion utilizing intermodal four-wave mixing to convert light between modes for complex applications.

As used herein, the term "about" or "approximately," or derivatives thereof, when referencing a numerical value, should be deemed to include within ten percent of such numerical value in either direction. In addition, when such terms are utilized to described absolutes (e.g., zero), the absolute should be deemed to include within one unit of reasonable measurement in either direction, as would ordinarily be used by those of ordinary skill in the art.

In accordance with embodiments of the present invention, it is possible to design a fiber having at least first and second modes to be involved in a mode conversion process and that the wavelength of the initial input mode (i.e., first mode) and the wavelength of the desired converted output mode (i.e., second mode) are not the same. Utilizing embodiments of the present invention, it is possible to generate light in different modes and at different wavelength without being restricted to the wavelength of the initial input mode. In addition, in certain embodiments, it may be feasible to have four different modes involved in a single four wave mixing process, and multiples thereof if multiple four wave mixing processes are applied.

In accordance with many embodiments of the present invention, intermodal four-wave mixing may be utilized to convert light from the first mode to the generated second mode. In general, the output wavelength of the second mode can be engineered by changing the fiber design, or more specifically, by changing the dispersion profile of the modes involved in the four-wave mixing process, in order to fulfill an energy conservation requirement and a phase matching condition at the given or desired wavelengths.

In accordance with one embodiment of the present invention, a fiber is designed using a phase matching condition between the modes involved in the four-wave mixing process, and also having a nonzero field overlap integral, such that it is possible to have an intermodal four-wave mixing process within the fiber.

The intermodal four-wave mixing process utilized herein is similar to a traditional four-wave mixing process except that the intermodal four-wave mixing process occurs between different modes, whereas the traditional four-wave mixing process is an interaction within the same mode. Generally, a known four-wave mixing process comprises two pump photons that are converted to a Stokes and an Anti-Stokes photon. The two pump photons may be from the same source and then the pump is said to be degenerated.

Throughout any four-wave mixing process, energy conservation is required along with momentum conservation for the process to occur. The energy conservation can be written as:

$$\omega_{pump,1} + \omega_{pump,2} = \omega_{Anti-Stokes} + \omega_{Stokes}$$

where omega (pump1, pump2, Anti-Stokes, Stokes) is the angular frequency of the interacting frequencies of the modes. In the intermodal four-wave mixing process of embodiments of the present invention, the interacting frequencies are not restricted to only one mode.

The phase match condition can be written as:

$$\Delta\beta = \beta_{pump,1}(\omega_{pump,1}) + \beta_{pump,2}(\omega_{pump,2}) - \beta_{Anti-Stokes}(\omega_{Anti-Stokes}) - \beta_{Stokes}(\omega_{Stokes})$$

where beta is the propagation constant. In the intermodal four-wave mixing process, the propagation constants are not restricted to only one mode as these are related to the interacting frequencies.

The maximum gain may likely occur when kappa is zero, and kappa is given as:

$$\kappa = \Delta\beta + 2\gamma P_0$$

where gamma is the nonlinearity of the fiber and $P_0$ is the pump power.

It should be noted that in the above exemplary formulas, a traditional four-wave mixing process is contemplated involving two pumps and a Stokes wave and an Anti-Stokes wave. In a more general case, however, there could be from one to n pumps, from one to m Stokes waves, and from one to l Anti-Stokes waves, where n, m, and l are integers ≥1.

Then the efficiency of the four-wave mixing process is directly related to the integral of the transverse field overlap of the modes involved in the four-wave mixing process. The overlap integral can be written as:

$$N = \frac{1}{A_{eff,FWM}}$$

$$= \frac{\sqrt{\int(F_{pump,1})^2 dA} \sqrt{\int(F_{pump,2})^2 dA} \sqrt{\int(F_{Anti-Stokes})^2 dA} \sqrt{\int(F_{Stokes})^2 dA}}{\int F_{pump,1} F_{pump,2} F_{Anti-Stokes} F_{Stokes} dA}$$

Where N is the overlap integral of the four-wave mixing process, which is also inversely proportional to the effective area of the four-wave mixing process. F is the transverse field, which in this notation is purely real. dA indicates that the integral has to be performed over the transverse cross-section.

The large the overlap integral is the more efficient is the process. For the process, described later in in the section on the experimental embodiment, the modes used in the four-wave mixing process is two degenerate $LP_{01}$ at the same wavelength as the pump, one $LP_{01}$ as the Anti-Stokes, and one $LP_{02}$ as the Stokes. The first number in is the mode numbering which is zero for all here is the angular symmetry, this means that the modes have some similarities, which is important for the overlap integral. If one of the modes was $LP_{XY}$ where X was different from zero then overlap integral would be zero, if two of the modes were $LP_{XY}$ then overlap would not be zero. What is important is that if the X number differs for some of the modes involved then for the overlap to non-zero would require that the modes come in a pair, for example, two of the modes would have one value of X and the two other modes could another value of X and the overlap would be non-zero.

In another embodiment of the present invention, a method for converting light from a first mode at a first wavelength to a second mode at a second wavelength using intermodal four-wave mixing, comprises the steps of: inputting an optical signal at a specific wavelength at a first mode into a fiber supporting more than one mode, and converting the signal from the first mode to the second mode at the second wavelength using a four-way mixing process. Further embodiments of the present invention include designing a fiber to support at least two modes, the fiber having a dispersion profile of the considered or desired modes such that the light is converted from one or more specific input wavelengths to specific output wavelength(s) in some specific input and output modes.

Experimental Embodiment

In one exemplary embodiment, described in more detail below, an input light is provided in the $LP_{01}$ mode (i.e., a first mode) at a first wavelength of 1064 nm. In the fiber, the first mode could act as a degenerated pump and through the intermodal four-wave mixing processing, converts light to an Anti-Stokes wave in the $LP_{01}$ mode at a wavelength of 941 nm and a Stokes wave in the LP02 mode (i.e., second mode) at a wavelength of 1225 nm. The process could also be reversed by having the input light at 941 nm in the first mode (LP01) and at 1225 nm in the second mode (LP02) to generated light at 1064 nm in the first mode.

In preparing the experimental embodiment described herein, it was considered that applying intermodal four-wave mixing in optical fibers would achieve nonlinear wavelength conversion without having to pump close at the zero-dispersion wavelength, which, consequently, generate unwanted supercontinuum light. Other known experiments using photonic crystal fibers have shown that pump photons in the $LP_{01}$ mode can generate anti-Stokes and Stokes photons in a higher-order-mode (HOM), such as the $LP_{11}$ mode, with conversion efficiency over 7%.

In considering the above operational parameters, the desired index profile for the fiber was constructed. Such construction process is described in detail in commonly owned U.S. patent application Ser. No. 13/945,475, filed Oct. 9, 2012, the disclosure of which is incorporated by reference herein in its entirety.

Regarding the index profile of the fiber, the fiber comprises a central core, an inner trench surrounding the core, a ring surrounding the trench, an outer trench surrounding the ring, and an outer cladding.

In some embodiments, the central core of the fiber may generally have a raised index region, having a radius of between about 0.75 µm to about 2.0 µm, and having an index difference to the outer cladding of between about 20.0 to about 40.0 (measured in $10^{-3}$). In one exemplary embodiment, the central core may comprise $SiO_2$ doped with an appropriate amount of $GeO_2$ to achieve a desired index, but may comprise other dopants.

The inner trench may be a depressed index region, having a width of between about 1.75 µm to 2.5 µm, and having an index difference to the outer cladding of between about −3.0 to about −13.0 (measured in $10^{-3}$). The inner trench may generally comprise $SiO_2$ doped with the appropriate amount of F, and optionally $GeO_2$, to achieve a desired index.

The ring may be a raised index region, having a width of between about 2.0 µto 5.0 µm, and having an index difference to the outer cladding of between about 5.0 to about 20.0 (measured in $10^{-3}$). The ring may generally comprise $SiO_2$ doped with the appropriate amount of $GeO_2$, and optionally F, to achieve a desired index.

The outer trench generally has a width of between about 1.75 µm to 4.5 µm, and has an index difference to the outer cladding of between about 1.5 to about −3.5 (measured in $10^{-3}$). The outer trench may generally comprise $SiO_2$ doped with the appropriate amount of $P_2O_3$, F, and optionally $GeO_2$, to achieve a desired index.

In many embodiments, the outer cladding comprises $SiO_2$, and has an outer radius of between about 50 µm to about 75 µm.

The specific design of one exemplary first designed fiber is shown in Table 1 below:

TABLE 1

Exemplary Fiber

The LS5 fiber
| Region | Dimension | Index difference to outer cladding |
| --- | --- | --- |
| Core | Radius = 1.25 µm | $\Delta n = 28.5 \cdot 10^{-3}$ |
| Trench | Width = 2.09 µm | $\Delta n = -5.9 \cdot 10^{-3}$ |
| Ring | Width = 3.51 µm | $\Delta n = 10.5 \cdot 10^{-3}$ |
| Cladding | Width = 2.84 µm | $\Delta n = -0.5 \cdot 10^{-3}$ |
| Outer Cladding | Radius = 62.5 µm | $\Delta n = 0$ |

Accordingly, in the present experimental embodiment, intermodal four-wave mixing was demonstrated in an all-fiber system. The system comprised a picosecond passive mode-locking fiber laser and an HOM fiber, as described above, in which the $LP_{01}$ and $LP_{02}$ modes are both well-guided. Using the all-fiber system, the phase-matching requirement was fulfilled using two $LP_{01}$-mode pump photons, and one $LP_{01}$-mode Anti-Stokes photon and one $LP_{02}$-mode Stokes photon. The Anti-Stokes and Stokes waves were generated at 941 nm and 1225 nm, respectfully, with 20% conversion efficiency from the pump to the Anti-Stokes.

The exemplary all-fiber system utilized a fiber laser to provide input pulses to the HOM fiber. The fiber laser comprised a SESAM-based laser cavity at 1064 nm, and two ytterbium doped fiber amplifiers. The output of the exemplary fiber laser was an 18.33 MHz pulse train with a maximal power of 470 mW. The pulse width was approximately 6 ps. The fiber laser was directly connected to 1.75 m of HOM fiber, using a core alignment fusion splicer, for example, a commercially available fusion splicer sold by Fujikura Ltd. as the FSM-30S Splicer. After the splice, more than 95% of the power in the HOM fiber was guided in the LP01 mode.

An optical spectrum analyzer and a second-order interferometric autocorrelator were used to characterize the spectral and temporal features of the Stokes and Anti-Stokes pulses. The spatial profiles of the two pulses were magnified by 100 times in a 4F system, and were measured by scanning a 20-µm pinhole with a Germanium photodiode detector.

FIG. 1 depicts graphs showing the effective refractive index of the $LP_{01}$ and $LP_{02}$ modes of a higher order mode fiber (left), and a propagation constant mismatch $\Delta\beta$ as a function of Stokes shift $\Omega$, for a pump wavelength at 1064 nm, in accordance with one experimental embodiment of the present invention. To generate Stokes photons in the $LP_{02}$ mode and Anti-Stokes photons in $LP_{01}$ mode efficiently, the propagation constant mismatch $\Delta\beta$, which can be written as $2\beta_{01,P}-\beta_{01,A}(\Omega)-\beta_{02,S}(\Omega)$, must be equal to zero. In the equation, $\beta$ is the propagation constant and the subscripts signify the pump (P), Anti-Stokes (A) and Stokes (S) in the $LP_{01}$ mode (01) and $LP_{02}$ mode (02), where $\Omega$ is the Stokes shift. $\Delta\beta$ as a function of $\Omega$ is derived from the effective refractive index as shown in FIG. 1 (left), is shown in FIG. 1 (right). With pump light at 1064 nm, the phase-matching condition was satisfied at $\Omega=37$ THz, corresponding to an Anti-Stokes wavelength of 941 nm and a Stokes wavelength of 1225 nm.

Figure 2:
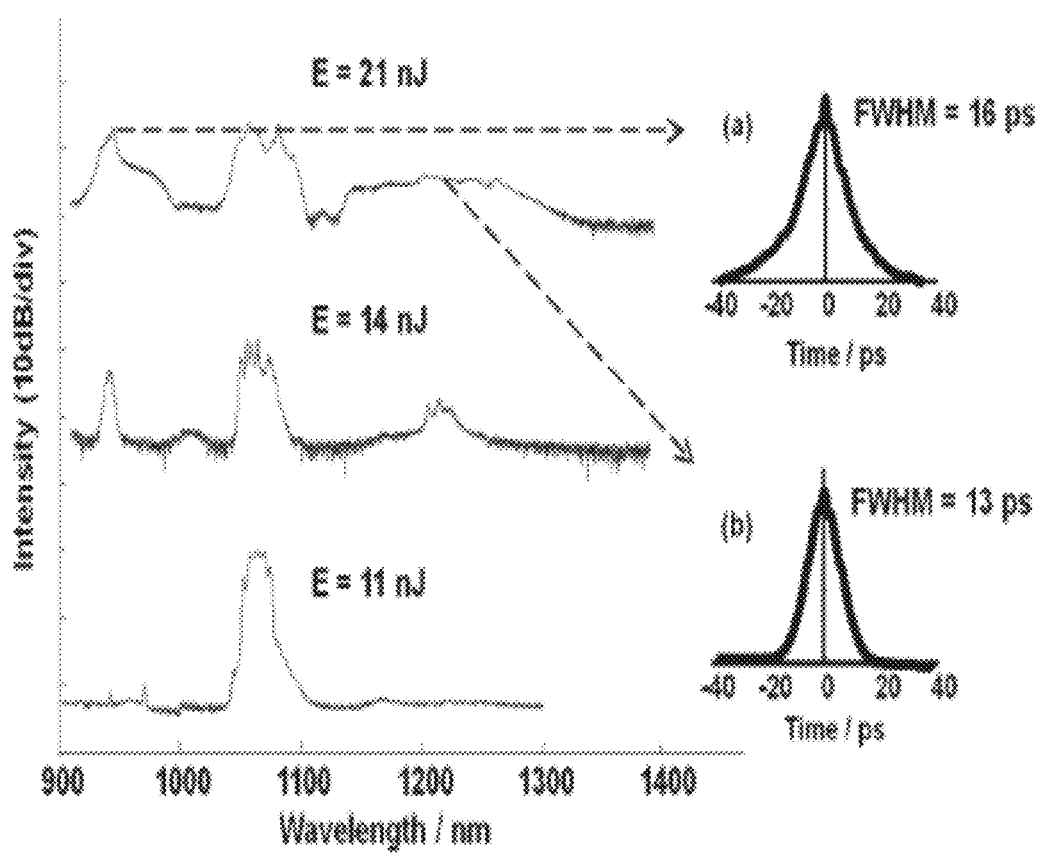
FIG. 2 depicts graphs showing output spectra from 1.75 m of an HOM fiber with input pulse energies of 11 nJ, 14 nJ, and 21 nJ, and (a) an intensity autocorrelation trace of the Anti-Stokes light, and (b) the Stokes light, in accordance with an experimental embodiment of the present invention.

After running the experimental embodiment, the theoretically predicted intermodal four-wave mixing was validated by the experimental results. FIG. 2 depicts graphs showing output spectra from 1.75 m of an HOM fiber with input pulse energies of 11 nJ, 14 nJ, and 21 nJ, and (a) an intensity autocorrelation trace of the Anti-Stokes light, and (b) the Stokes light, in accordance with the experimental embodiment of the present invention. As shown in FIG. 2, at pump power below 200 mW (11 nJ input energy), only self-phase modulation-induced spectral broadening can be observed. However, at higher pump power, strong and narrowband Anti-Stokes light at 941 nm and broadband Stokes light at 1225 nm are simultaneously generated. The center wavelengths of both sidebands were found to substantially match the initial calculation.

Figure 3:
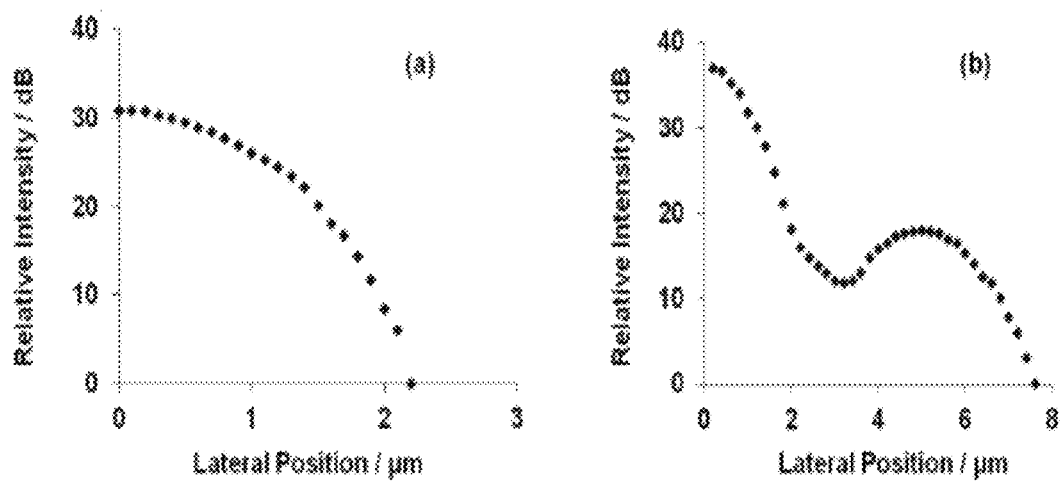
FIG. 3 depicts graphs showing measured spatial profile of the Anti-Stokes light at 941 nm (left) and the Stokes light at 1225 nm (right) in accordance with an experimental embodiment of the present invention.

In the experiment, up to 385 mW power (21 nJ pulse energy) was coupled into the HOM fiber to achieve high conversion efficiency. Approximately 4.2 nJ pulse energy was generated in the Anti-Stokes sideband, corresponding to 20% conversion efficiency. The intensity autocorrelation of the Anti-Stokes and Stokes light were measured, and are shown in FIG. 2(a) and (b), respectively. The Anti-Stokes and Stokes light were broadened to 16 ps and 13 ps in the fiber, due to dispersion as well as temporal walk-off between the pump pulse and the Anti-Stokes/Stokes pulse. FIG. 3 depicts graphs showing measured spatial profiles of the Anti-Stokes light at 941 nm (left) and the Stokes light at 1225 nm (right) in accordance with an experimental embodiment of the present invention.

The autocorrelation measurement indicates good power stability of the Anti-Stokes/Stokes pulse. As both the $LP_{01}$ and $LP_{02}$ mode are well-guided in the HOM fibers, the demonstrated experimental intermodal four-wave mixing effect was shown to be much less sensitive to fiber perturbation than what has been observed in photonic crystal fibers.

The experimental embodiment discussed herein has shown that intermodal four-wave mixing in an all-solid silica-based HOM fiber may be significantly advantageous for a variety of commercial applications and other embodiments. In particular, narrowband Anti-Stokes light at 941 nm with up to 4.2 nJ pulse energy has been obtained with approximately 20% power conversion efficiency. Such an experiment demonstrates that the HOM fiber module may be used in an all-fiber configuration to achieve stable and efficient wavelength conversion.

While the foregoing is directed to embodiments of the present invention, other and further embodiments of the invention may be devised without departing from the basic scope thereof. It is also understood that various embodiments described herein may be utilized in combination with any other embodiment described, without departing from the scope contained herein. In addition, embodiments of the present invention may be further scalable, as particular applications may require.

What is claimed is:

1. A fiber comprising:
   an input end for receiving light in a first mode at a first wavelength;
   an output end for outputting light in a desired second mode at a desired second wavelength, the second wavelength being controlled by changing dispersion profiles of the modes involved in a intermodal four-wave mixing process; and
   a means for applying intermodal four-wave mixing to convert the first mode at the first wavelength to the second mode at the desired second wavelength;
   wherein the first wavelength and the second wavelength are not the same;
   wherein the fiber comprises a higher-order mode fiber; and
   wherein there is a nonzero field overlap integral between modes involved in the intermodal four-wave mixing process.

2. The fiber of claim 1, wherein the phases of the modes involved in the intermodal four-wave mixing process match.

3. A system for non-linear mode conversion comprising:
   a light source for providing an input light in a first mode at a first wavelength; and
   a fiber comprising:
      an input end for receiving the input light from the light source;
      an output end for outputting light in a desired second mode at a desired second wavelength, the second wavelength being controlled by changing dispersion profiles of the modes involved in a intermodal four-wave mixing process; and
   a means for applying intermodal four-wave mixing to convert the first mode at the first wavelength to the second mode at the desired second wavelength;
      wherein the first wavelength and the second wavelength are not the same;
      wherein the fiber comprises a higher-order mode fiber; and
      wherein there is a nonzero field overlap integral between the first mode and the second mode.

4. The system of claim 3, wherein the phase of the first mode matches the phase of the second mode.

5. A method of nonlinear mode conversion of light comprising:
   providing a light source capable of producing an input light in a first mode at a first wavelength;
   providing a fiber having an input end for receiving the input light from the light source, and an output end for outputting an output light in a desired second mode at a desired second wavelength;
   generating the input light at the light source; and
   utilizing a means for applying intermodal four-wave mixing to convert the input light to the output light;
   wherein the first wavelength and the second wavelength are not the same;
   wherein the fiber comprises a higher-order mode fiber;
   wherein conversion of the input light to output light by intermodal four-wave mixing converts the first mode at the first wavelength to the second mode at the desired second wavelength;
   wherein the second wavelength can be controlled by changing dispersion profiles of the first mode and second mode; and
   wherein there is a nonzero field overlap integral between the first mode and the second mode.

6. The method of claim 5, wherein the phase of the first mode matches the phase of the second mode.

* * * * *